(12) United States Patent
Schultheiss et al.

(10) Patent No.: US 11,379,251 B2
(45) Date of Patent: Jul. 5, 2022

(54) METHOD FOR EXECUTING A COMPUTER PROGRAM IN A COMPUTER NETWORK, IN PARTICULAR IN ORDER TO CONTROL A MICROSCOPE

(71) Applicants: Carl Zeiss Microscopy GmbH, Jena (DE); Carl Zeiss AG, Oberkochen (DE)

(72) Inventors: Christian Schultheiss, Munich (DE); Stefan Schneider, Laufen (DE); Daniel Butnaru, Munich (DE); Sreenivas Naga Bhattiprolu, Dublin, CA (US); Bernhard Fichtl, Unterhaching (DE); Norbert Riedelsheimer, Augsburg (DE); Benjamin Mosig, Munich (DE)

(73) Assignees: Carl Zeiss Microscopy GmbH, Jena (DE); Carl Zeiss AG, Oberkochen (DE)

( * ) Notice: Subject to any disclaimer, the term of this patent is extended or adjusted under 35 U.S.C. 154(b) by 84 days.

(21) Appl. No.: 16/971,063

(22) PCT Filed: Feb. 28, 2019

(86) PCT No.: PCT/EP2019/055069
§ 371 (c)(1),
(2) Date: Aug. 19, 2020

(87) PCT Pub. No.: WO2019/166589
PCT Pub. Date: Sep. 6, 2019

(65) Prior Publication Data
US 2020/0394050 A1    Dec. 17, 2020

(30) Foreign Application Priority Data
Mar. 1, 2018   (DE) .................... 10 2018 104 752.5

(51) Int. Cl.
*G06F 9/30* (2018.01)
*G06F 9/448* (2018.01)
*G06F 9/455* (2018.01)

(52) U.S. Cl.
CPC ............ *G06F 9/4484* (2018.02); *G06F 9/455* (2013.01)

(58) Field of Classification Search
CPC .................................................. G06F 9/4484
See application file for complete search history.

(56) References Cited

U.S. PATENT DOCUMENTS

| | | | |
|---|---|---|---|
| 8,112,749 B2 * | 2/2012 | Jelinek .................... | G06F 9/455 718/1 |
| 2005/0120122 A1 * | 6/2005 | Farnham ................. | H04L 69/32 709/230 |

(Continued)

OTHER PUBLICATIONS

Anderson, Melissa; "How to Share Data Between Docker Container"; https://wwww.digitalocean.com/community/tutorials/how-to-share-data-between-docker-containers in https://web.archive.org May 18, 2017; pp. 1-13.

(Continued)

*Primary Examiner* — Jae U Jeon
(74) *Attorney, Agent, or Firm* — Duane Morris LLP

(57) ABSTRACT

A method for executing and translating a computer program in a computer network, in particular for controlling a microscope, wherein in the case of at least one function call to the relevant second function, multiple return values from multiple preceding function calls are transferred as separate parameters. This allows significantly more complex and flexible function calls. More flexibility in the execution of container-based functions of a computer program in a computer network can additionally be achieved in that the computer program has not only function calls but also instructions for controlling the program flow, for example (Continued)

instructions for the conditional execution of program sections and jump instructions. The development of container-based computer programs can be simplified and speeded up by providing a database that contains the execution requirements of the function modules and also the interface definitions thereof. This permits a static typing of variables.

15 Claims, 3 Drawing Sheets

(56) References Cited

U.S. PATENT DOCUMENTS

| 2009/0113408 A1* | 4/2009 | Toeroe | G06F 9/4406 |
| | | | 717/168 |
| 2009/0217299 A1* | 8/2009 | Belluati | H04Q 3/0058 |
| | | | 719/318 |
| 2017/0163518 A1 | 6/2017 | Dube et al. | |

OTHER PUBLICATIONS

Anonymous; "GitHub—CenturyLinkLabs/dray: an engine for managing the execution of container-based workflows"; XP055591756; Feb. 16, 2016; pp. 1-10.
International Search Report for PCT/EP2019/055069 dated Jun. 12, 2019.
German Search Report for DE 10 2018 104 752.5 dated Feb. 4, 2019.

\* cited by examiner

METHOD FOR EXECUTING A COMPUTER PROGRAM IN A COMPUTER NETWORK, IN PARTICULAR IN ORDER TO CONTROL A MICROSCOPE

RELATED APPLICATIONS

The present application is a U.S. National Stage application of International PCT Application No. PCT/EP2019/055069 filed on Feb. 28, 2019, which claims priority benefit of German Application No. DE 10 2018 104 752.5 filed on Mar. 1, 2018, the contents of each are incorporated by reference in their entirety.

FIELD OF THE INVENTION

The invention relates to the execution of computer programs in a computer network, in particular for controlling a microscope. Such a computer network can also be referred to as a computing cloud. It goes without saying that the invention relates not only to a computer network provided by a service provider ("public cloud") but also to a computer network that is operated exclusively for the organization executing the computer program ("private cloud"), or hybrid forms of these.

The invention also relates to a method for translating a computer program from one representation into another representation, in particular into a machine-executable representation.

BACKGROUND OF THE INVENTION

For the purposes of the invention, a computer program is a sequence of computing instructions, which can be function calls, in particular.

In a computer network, physical or virtual computers can be connected to one another, for example via a network such as "Ethernet" (IEEE 802.3) and "WLAN" (IEEE 802.11) or bus systems such as "CAN" (ISO 11898), "Firewire" (IEEE 1394). A virtual computer can, by way of example, be connected via a virtual network interface.

In a computer network, the individual functions of a computer program can be in the form of separately executable program files (also referred to as executable modules below) in different execution environments, for example precisely one function (and hence one executable module) per execution environment. A call to the function then starts the associated executable module in its execution environment. An execution environment can be a virtual machine or a (virtual) container.

A virtual machine contains not only the executable module, including any library files for dynamic linking to the executable file, but also an operating system core, in particular. A virtual machine can contain further files or other data (for example a database) needed for executing the module, and simulates the presence of a computer by means of software. This computer is virtual.

A container does not contain an operating system core, on the other hand. The virtualization takes place in this instance at the level of the application environment, that is to say the runtime environment of the executable module. Modules that run on the same computer in different containers use the same operating system core—that of the computer. The other resources of the computer can be split between multiple containers or shared by them. However, the containers are isolated from one another and basically from the rest of the computer. Only defined resources of the computer can be accessed from a container, for example specific files or directories. This environment partitioned off from other containers and other system resources is referred to as a namespace. The libraries, files and other data contained in a namespace can be used only by the module(s) contained in the same namespace. They are not accessible from containers outside the namespace, however.

Containers and namespaces are provided for example by the Linux operating system via the interfaces "LXC", "LXD" or "runc" and what are known as control groups (cgroups). Management of containers is provided by the software "Docker" (http://www.docker.com), for example.

In the prior art, the project "dray" (http://dray.it) discloses an automated execution of a computer program in a computer network by means of containers managed by Docker. Multiple functions, which are contained in different containers in the form of a respective executable program file, are called sequentially, similarly to an anonymous pipe. The return value of each called function is transferred as input parameter to the next function. For this purpose, returned values are read in either a) from the standard output channel (stdout) or b) from the standard error output channel (stderr) or c) from a file specified by name beforehand, and are automatically transferred to the immediately next function via the standard input channel (stdin) thereof. The containers are started and ended automatically as required (that is to say when a contained function is called, for example).

The encapsulation of functions as executable modules in isolated containers has several advantages over an anonymous pipe. Besides increased security, robustness and scalability, easier maintenance of a module, including its dependencies (libraries), is also possible, regardless of the dependencies of other modules.

However, the known solution has the disadvantage that only rigid processes are possible. The executable computer programs are thus inflexible.

OBJECT OF THE INVENTION

The invention is based on the object of improving a method of the type cited at the outset and a corresponding apparatus, so that computer programs can be designed and executed more flexibly. According to a particular aspect, the development of computer programs is also supposed to be simplified and speeded up.

This object is achieved by a method that has the features specified in claims 1, 2 and 5 and by an apparatus that has the features specified in claim 15.

Advantageous refinements of the invention are specified in the dependent claims.

Within the context of the invention, it was recognized that more flexibility in the execution of a computer program in a computer network can be achieved in that, in the case of at least one function call to the relevant function, multiple return values from multiple preceding function calls can be transferred as separate parameters. For each function call, a container is preferably loaded as execution environment and unloaded again upon completion of the called function.

Whereas for example the prior art involves a container being closed after a first function is ended and its return value is read in and the read-in value only being copied to the standard input channel of a second function and then discarded, the more flexible form proposed here requires buffer-storage of each return value, either explicitly in a variable specified in the computer program or, if the first function in the computer program to be executed is contained directly as a parameter (function argument) in the call to a second function, implicitly in a memory that is not accessible to explicit instructions of the computer program. This allows significantly more complex and flexible function calls.

Other functions called in the computer program can either have one or more parameters (function arguments) transferred to them, or they are parameterless. Each function can either return one or more values or is free of return values. A value returned by a function can be explicitly buffer-stored as content of a variable and/or transferred directly within a function call as a parameter of a function. Content of variables can be transferred as parameters during later function calls.

There is accordingly provision for the following steps for executing a computer program:

providing a computer network that comprises at least two computers connected to one another via a network, each having its own main memory per computer, providing at least three different images of execution environments, each of which comprises a respective executable module, wherein each of these modules provides a respective function (which returns at least one result value), and the execution environment containing this module is executable on at least one of the computers in a namespace of its own, wherein the module calls an operating system core of the relevant computer, and this work environment returns a value that is output by this module as the result of the function provided thereby, receiving a computer program that has at least a) a first instruction, which calls a first function that returns a first result value, b) a second instruction, which calls a second function that returns a second result value, and c) a third instruction, which calls a third function with the first result value as a first parameter and with the second result value as a second parameter, starting an execution environment with the module providing the first function, and receiving the return value thereof as first result value, starting an execution environment with the module providing the second function, and receiving the return value thereof as second result value, starting an execution environment with the module providing the third function, wherein the first result value and the second result value are transferred as parameters to the module.

Within the context of the invention, it was also recognized that more flexibility in the execution of a computer program in a computer network can be achieved in that the computer program has not only function calls but also instructions for controlling the program flow, for example instructions for the conditional execution of program sections and jump instructions (conditional or unconditional).

There is accordingly provision for the following steps for executing a computer program:

providing a computer network that comprises at least two computers connected to one another via a network, each having its own main memory per computer, providing multiple different images of execution environments, each of which comprises a respective executable module, wherein each of these modules provides a respective function (which returns at least one result value), and the execution environment containing this module is executable on at least one of the computers in a namespace of its own, wherein the module calls an operating system core of the relevant computer, and this work environment returns a value that is output by this module as the result of the function provided thereby, receiving a computer program that has at least a) a first instruction, which calls a first function that returns a first result value, b) a second instruction, which contains a condition on the basis of the first result value, and c) a third instruction, which calls a third function, starting an execution environment with the module providing the first function, and receiving the return value thereof as first result value, checking the condition indicated in the second instruction, ascertaining that the condition is satisfied, and starting an execution environment with the module providing the third function.

According to a particular aspect, it was also recognized in the context of the invention that the development of computer programs can be simplified and speeded up by providing a database in the computer network in which the computer program is to be executed, which database contains the execution environments of the function modules and also the interface definitions thereof, wherein the interface definition of an execution environment (or of the module contained therein) includes the data type of the result value of the module contained and also the data type or data types of the parameter or parameters of the module contained.

In this way, a static typing of variables and also function arguments can be realized and checked. As a result, run-time errors can be avoided in favor of compile-time errors, which simplifies and speeds up the entire development process. In the prior art, incorrect data types can only be recognized at runtime, which means that the correction cycles are significantly longer.

The database containing the execution environments can advantageously be provided in such a way that, besides the first interface definition with the data types of the result values and parameters for each of the modules, it contains a second interface definition of its own that describes user inputs interactively expected by the relevant module, expediently also including a respective data type of the user input(s). In this way, user inputs can be received at any time during execution. In particular, however, the computer program can advantageously be executed in such a way that all user inputs for all modules are queried and received before the execution of the computer program even begins, which means that the process is not interrupted for an indefinite period by user queries. A further advantage is that one and the same module can be used in a multiplicity of different computer programs without changing the content. Through the two interface definitions (data types of result value and parameters and also parameters to be received interactively)

Expediently, the database can contain the execution environments in the form of a respective reference and/or image.

Accordingly, provision is made for the following steps for translating a computer program from one representation into another representation, in particular into a machine-executable representation:

providing a computer network that comprises at least two computers connected to one another via a network, each having its own main memory per computer, providing a database that contains multiple different execution environments, each of which comprises a respective executable module, wherein each of these modules provides a respective function (which returns at least one result value), and the execution environment containing this module is executable on at least one of the computers in a namespace of its own, wherein the module calls an operating system core of the relevant computer, and this work environment returns a value that is output by this module as the result of the function provided thereby, wherein the database contains, in addition to each of the modules, an interface definition of its own that describes the function provided by the relevant module, and is connected to the network, reading in a computer program that has at least a) a first instruction, which calls a first function that returns a result value, and b) a second instruction, which calls a second function with the received result value of the first function as a parameter, reading in a first interface definition of a first module providing the first function, wherein the first interface definition describes the first function by virtue of its containing at least one data type of its result value, from the database, reading in a second interface definition of a second module providing the second function, wherein the second interface definition describes the second function by virtue of its containing at least one data type of a parameter of the second function, from the database, and comparing the data type of the result value of the first function with the data type of the parameter of the second function, ascertaining inequality between the two data types, and sending an error to an input apparatus and/or terminating the translation process.

The first instruction and the second instruction can be identical by virtue of the result value of the first function being transferred as a parameter of the second function. In particular, the first function and the second function can be identical in this instance by virtue of this function being called recursively.

When the translated computer program is executed, the instructions contained in the translated representation are executed and it is advantageously ascertained that, for one of the instructions, a function called in this instruction is provided by one of the execution environments contained in the database, and then i) the relevant execution environment is loaded on one of the computers, ii) the module contained therein is executed on the relevant computer, and iii) the value output by this module is read in as result value of the function provided by this module.

After the result value is read in, the relevant execution environment can be unloaded in a step iv). Loading as required and unloading upon completion of a function call reduces the energy consumption of the computer network and the cost involvement.

In a particularly advantageous embodiment, a microscope is connected to the network via a control computer and, when one of the instructions contained in the translated representation is executed, a control instruction is conveyed from the executing computer to the microscope, in particular to trigger an image recording on the microscope, wherein the recorded image from the control computer to one of the other computers. In this way, an image recording can, in particular, be repeated without delay due to a user interaction if it is ascertained during the execution of the computer program that an image previously recorded with the microscope and transmitted in the computer network does not satisfy a predetermined criterion. Such a criterion can be for example a threshold value for an image quality measure or for a number of identifiable fluorescent markers.

In such a case, the prior art requires the execution of the computer program to be terminated and the entire process to be repeated after a new, manually triggered image recording. Advantageously, with the embodiment according to the invention, only the image recording and the instructions of the computer program directly or indirectly from the recorded image need to be repeated.

Expediently, none of the execution environments contain an operating system core callable by the relevant module. The modules are then advantageously provided only by container virtualization.

Moreover, it can be advantageous to provide the execution environments contained in the database statelessly.

In a further advantageous embodiment, before the instructions contained in the computer program are executed, a probable computing time and a frequency of being called can be forecast for each function contained in the computer program. In this way, the expected total computing time and the expected duration of the execution can be ascertained. One or both of these variables can be displayed to the user with a control element for terminating the execution before the execution begins, so that he can terminate the execution in good time.

The invention also includes a computer network configured to perform one of the methods described above, in particular having a microscope connected to the computer network via a control computer, wherein the control computer is configured such that it receives a control instruction for the microscope from one of the other computers and controls the microscope in accordance with the instruction.

The invention allows complex workflows in microscopy to be largely simplified and automated without the user needing to know the details of the process. The user merely needs to position the sample to be examined in the microscope and start a workflow in the form of a computer program that is executed in a computing cloud. If required, he is then asked for predetermined inputs.

BRIEF DESCRIPTION OF THE DRAWINGS

The invention is explained in more detail below on the basis of exemplary embodiments.

In the drawings.

In all of the drawings, corresponding parts bear the same reference signs.

DETAILED DESCRIPTION OF THE DRAWINGS

Figure 1:
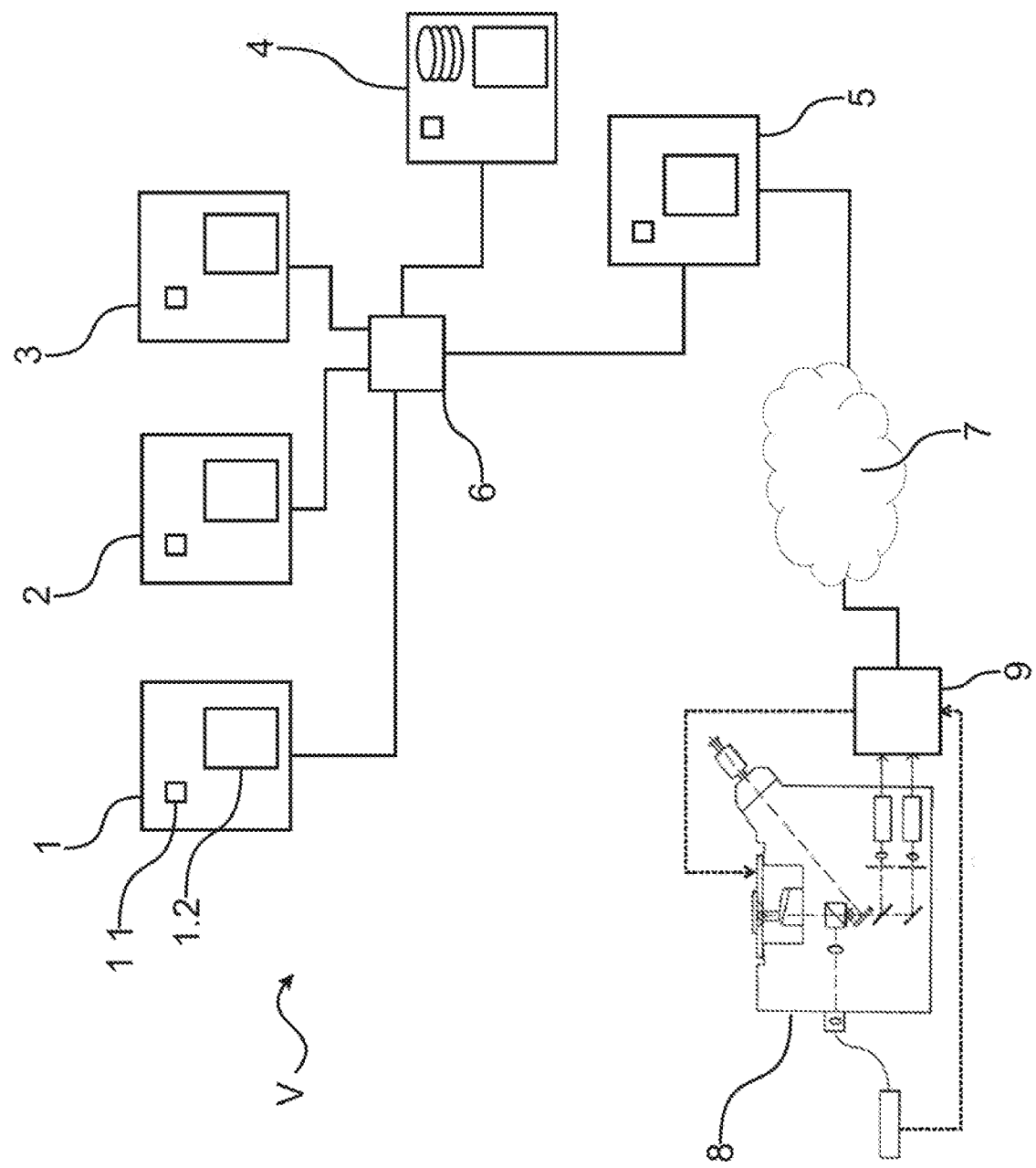
FIG. 1 is a schematic diagram illustrating a computer network having a microscope.

FIG. 1 schematically shows a computer network V in the form of a computing cloud which, purely by way of example, comprises three computers 1/2/3, a database server 4 and an access point server 5, which are connected to one another via an Ethernet switch 6. The access point server 5 is accessible from the Internet 7. A microscope 8, which has a control computer 9, is connected via the Internet 7 to the access point server 5 and, via the latter, to the computer network V. Alternatively, a further computer, which has a user interface and forms an input apparatus, can be arranged between the control computer 9 and the Internet 7. As such, a computer program can, in particular, contain instructions with image data that trigger a display of these image data on the further computer.

Each of the computers 1/2/3/4/5 has its own processor and own main memory. They are thus physical computers. For the sake of clarity, only the processor 1.1 and the main memory 1.2 of the first computer 1 are provided with reference signs. For example the Linux operating system with containers and control groups is provided on each of the computers 1/2/3/4/5. Together, the computers 1/2/3 form a Docker swarm.

The database of the database server 4 contains a multiplicity of images of containers as execution environments for an identical number of executable modules, each module providing exactly one respective function that accepts a non-negative natural number of parameters and returns a result value at the end of its execution. The database also contains a first interface definition for each of these functions, which describes the number of parameters of said functions and the data types of said parameters. Moreover, the database contains a second interface definition for each of the functions, which describes a number of user inputs interactively expected by the relevant module and the data types of said user inputs. In addition, the database can also contain a version statement for each execution environment. This allows different versions of the same module to be provided in parallel. This makes it possible to make new versions of a module available without existing computer programs needing to be adapted. For this purpose, a required version of a function can be specified as a meta-parameter when calling the function.

The execution environments are executable on the computers 1/2/3 in a respective namespace of their own, calling an operating system core of the relevant computer, since, as containers, they do not contain an operating system core themselves. To this end, they can be produced and started by Docker. The Docker swarm automatically decides on which of the computers 1/2/3 an execution environment to be started is loaded (produced from its image) and extended. In each execution environment, the parameters that the executable module contained needs in order to perform the provided function are set, for example as environment variable (s). The executable module can then read these in itself as its parameters, for example. At the end of its execution, it outputs the result of the function, for example in a file prescribed as a parameter or on the standard output channel.

The modules can be written in any (also different) programming languages and use any program libraries. They merely need to behave in accordance with the interface definitions in regard to parameter acceptance and return of result values. Another image with a version of the module can be installed in the database with little effort. For this purpose, the database To execute a computer program in the computer network V, the access point server 5 receives the computer program in machine-executable form, for example from the control computer 9 or from a web server (not shown), which can, in particular, be part of the computer network V.

The user can, by way of example, first enter a computer program in an editor, for example on the aforementioned further computer or on the aforementioned web server, in an application-specific language (domain-specific language) or load it from a mass storage device. The editor can graphically represent the computer program in the application-specific language in text form and/or as a flow diagram, for example. The user can edit the computer program either in text form or in graphical form. Changes to the flow diagram are made by the editor automatically in the text form of the computer program as appropriate. Conversely, changes to the text form are also made automatically in the flow diagram as appropriate. Before the computer program is executed, it is translated from the representation in the application-specific language into a machine-executable representation within the computer network V, for example on the control computer 9 or the aforementioned web server. An intermediate translation of the application-specific language into a further programming language can take place before the latter is translated into a machine-executable representation.

For translation, the computer program is first read in in the application-specific language. If a first instruction that calls a first function returning a result value and a second instruction that calls a second function with the received result value of the first function as a parameter are identified, the interface definitions of the modules providing the two functions are read in from the database and the data types, described therein, of the result value of the first function and of the relevant parameter of the second function are compared. If inequality is found, a check is first carried out to ascertain whether both cases involve image data types. If so, the translated representation of the computer program has an instruction inserted into it that calls a function for converting the result value into the image data type of the relevant parameter. This function call can be made in particular like other function calls of the computer program by executing a module contained in the database in an execution environment. Instead of an implicit type conversion of this kind by means of a transparent function call, the computer program could thus contain an express call to the same function.

If the data types ascertained as different are not two image data types, an error is sent to the input apparatus of the user, that is to say in this example to the aforementioned further computer or the aforementioned web server, in particular to the editor there, and/or the translation process is terminated. The editor can visually inform the user of the dissimilar data types, so that the user can correct the program error without first having to execute the computer program as far as the erroneous instruction in a time-consuming manner.

The computer system V is provided in such a way that, during the execution of a computer program, it logs the loading of all the execution environments required for this and the execution of all the modules contained therein, including the parameters transferred to them, and in particular the regular completion thereof, including the relevant result value and the required computing time, for example in the database of the database server 4. This means that after a system stop, be it as a result of a crash or due to regular maintenance, execution can be resumed with the last incompletely executed or unexecuted module without having to repeat already successful function calls. This also applies if multiple computer programs are executed in parallel. The logging is carried out separately for each computer program to be executed on the computer network.

The logged actually required computing times can be used in particular to forecast the expected computing times.

Advantageously, a computer program already executed once can be executed again in a shorter time after only a partial change to its instructions or its input data. For this purpose, the execution protocol is used to ascertain which instructions have remained unchanged both in the computer program and in all of the function modules called by each of them, that is to say also in the parameters used by them. Since files outside the computer program can also be transferred as parameters to functions of the program (for example by means of a file path or a URL statement), an absence of change is also ascertained in this respect. Only those instructions that were ascertained as not unchanged are actually executed when the computer program is executed again. For all instructions ascertained as unchanged, the return value of the previous call is loaded from the database instead.

One or more of the functions called by a computer program can trigger an image recording on the microscope 8 by virtue of the control computer 9 an applicable command is conveyed via the Internet 7. The control computer then sends the image data ascertained as part of the image recording to the computer network V via the Internet 7. There, they can be stored on the database server 4, for example. After the image data have been received completely, the module providing the relevant function returns, as result value, an object that represents the image data and can be specified as a parameter in a later call to an image-processing function.

Figure 2A:
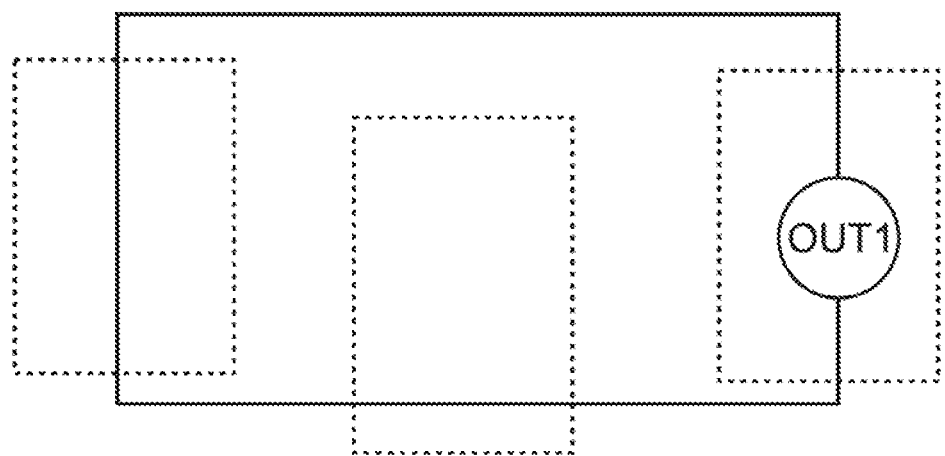
FIGS. 2A, 2B and 2C show three different modules provided in a respective execution environment and their interfaces.
Figure 2B:
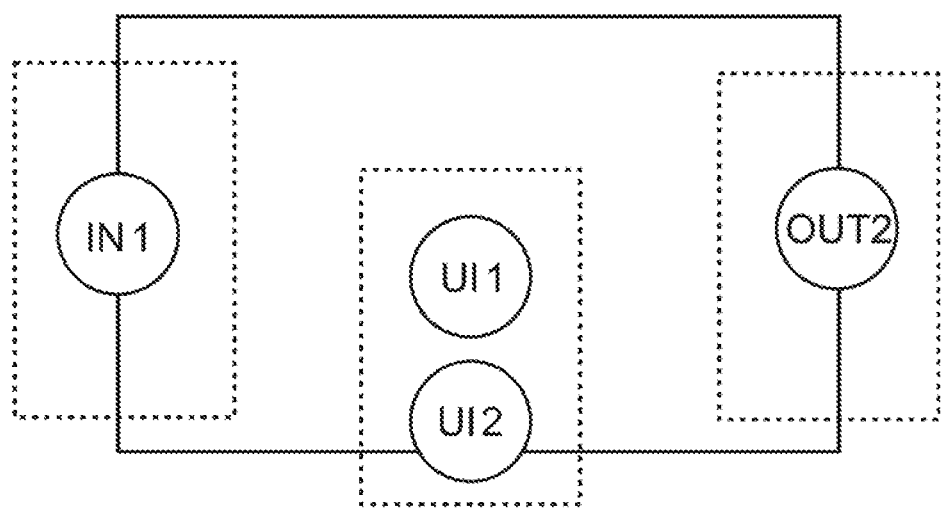
Figure 2C:
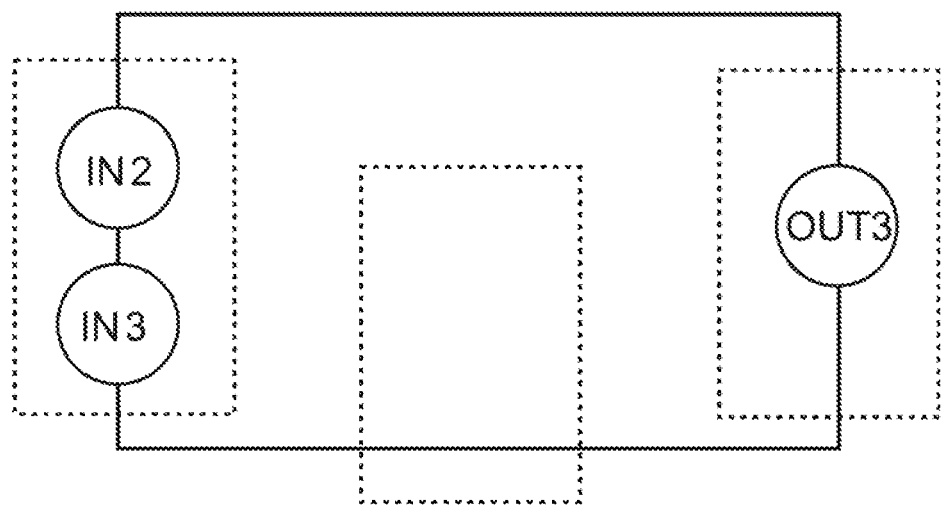

FIG. 2 schematically shows three different modules contained in execution environments, the images and interface definitions of which modules are contained in the database shown in FIG. 1, for example.

Figure element 2A depicts a module with a function "FunkA", which accepts no input parameter at all, does not require an interactive user input, but returns exactly one result value OUT1, for example an image data object type. The function provided by the module triggers an image recording in a connected microscope 8 and returns a the recorded image as result value, for example.

Figure element 2B depicts a module with a function "FunkB", which accepts exactly one parameter IN1, for example again an image data object type, requires two interactive user inputs and returns exactly one result value OUT2, for example again an image data object type. The user inputs need to be of floating point number and color value type, for example. The function provided by the module performs a segmentation in the received image data on the basis of the two numerical values entered by the user, for example, which prescribe a threshold value and a dye, for example. The detected segments are returned as result value OUT2 of the object list data type.

Figure element 2C depicts a module with a function "FunkC", which accepts exactly two parameters IN2, for example an image data object type, and IN3, for example an object list type, and does not require any interactive user inputs, but returns exactly one result value OUT3, in this instance of the integer type, for example. The function provided by the module performs a classification, for example for each object contained in the accepted object list IN2 that represents an image segment, on the basis of the image data in this segment, to which end the image data from the accepted image IN2 are used. The function then returns an object list OUT3, which contains a class statement for each segment contained in IN3.

A computer program can be designed using these three modules as follows, for example:

img: =FunkA ( )
sgm: =FunkB (img)
cls: =FunkC (img, sgm)

Here, "img", "sgm" and "cls" are variable identifiers to which memory locations are assigned. The returned result values are stored in the associated memory locations and, when a variable is used as a function parameter, are read again and transferred to the relevant function.

Figure 3:
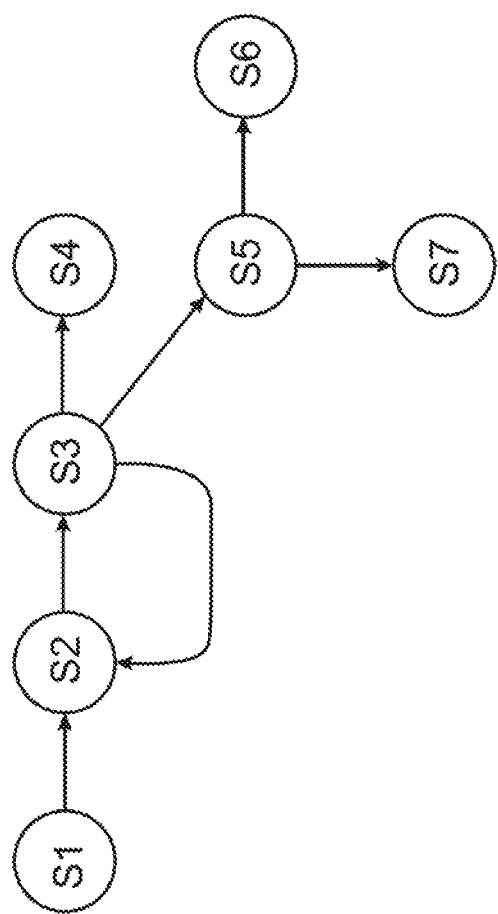
FIG. 3 shows a flowchart for a computer program executed on the computer network.

FIG. 3 schematically shows the sequence of a translated computer program in steps S1-S7, each step being with a call to a function by starting an executable module contained in the database in a respective execution environment. The computer program contains multiple instructions, each of which includes a condition on the basis of a previously ascertained result value of one of the cited functions. During execution of the program, when a conditional instruction, for example a conditional jump, is reached, the condition is checked and the conditional instruction is executed only if the check shows that the condition is satisfied.

In this way, conditional jumps can be used to provide an execution loop or alternatively a branch after step S3. Accordingly, a further branch can be achieved by a conditional jump after step S5.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

LIST OF REFERENCE SIGNS

V Computer network
1 First computer
1.1 Processor
1.2 Main memory
2 Second computer
3 Third computer
4 Database server
5 Access point server
6 Switch
7 Internet
8 Microscope
9 Control computer

What is claimed is:

1. A method for executing a computer program, comprising the following steps:
providing a computer network that has at least two computers connected to one another via a network, each having its own main memory per computer,
providing at least three different images of execution environments, each of which has a respective executable module, wherein each of these modules provides a respective function, and the execution environment containing this module is executable on at least one of the computers in a namespace of its own, wherein the module calls an operating system core of the relevant computer, and this work environment returns a value that is output by this module as the result of the function provided thereby,
receiving a computer program that has at least a) a first instruction, which calls a first function that returns a first result value, b) a second instruction, which calls a second function that returns a second result value, and c) a third instruction, which calls a third function with the first result value as a first parameter and with the second result value as a second parameter,
starting an execution environment with the module providing the first function, and receiving the return value thereof as first result value, starting an execution environment with the module providing the second function, and receiving the return value thereof as second result value, starting an execution environment with the module providing the third function, wherein the first result value and the second result value are transferred as parameters to the module.

2. The method as claimed in claim 1, further comprising: providing a database that contains the execution environments, wherein the database contains, in addition to each of the modules, an interface definition of its own that describes the function provided by the relevant module, and is connected to the network.

3. The method as claimed in claim 2, further comprising: providing the database that contains the execution environments such that the database contains, in addition to each of the modules, a second interface definition of its own that describes user inputs interactively expected by the relevant module.

4. The method as claimed in claim 2, wherein the database contains the execution environments in the form of a respective reference and/or image.

5. The method as claimed in claim 2, wherein the interface definitions, contained in the database, of the functions provided by the modules contain the data types of the input parameters and the data type of the result value of the respective function.

6. The method as claimed in claim 2, wherein the execution environments contained in the database are stateless.

7. The method as claimed in claim 1, wherein a microscope is connected to the network via a control computer and, when one of the instructions contained in the translated representation is executed, a control instruction is conveyed from the executing computer to the microscope, in particular to trigger an image recording on the microscope, wherein the recorded image from the control computer to one of the other computers.

8. The method as claimed in claim 1, wherein none of the execution environments contain an operating system core callable by the relevant module.

9. The method as claimed in claim 1, wherein, before the instructions contained in the computer program are executed, a probable computing time and a frequency of being called is forecast for each function contained in the computer program.

10. A method for executing a computer program, comprising the following steps:
providing a computer network that has at least two computers connected to one another via a network, each having its own main memory per computer,
providing multiple different images of execution environments, each of which has a respective executable module, wherein each of these modules provides a respective function, and the execution environment containing this module is executable on at least one of the computers in a namespace of its own, wherein the module calls an operating system core of the relevant computer, and this work environment returns a value that is output by this module as the result of the function provided thereby,
receiving a computer program that has at least a) a first instruction, which calls a first function that returns a first result value, b) a second instruction, which contains a condition on the basis of the first result value, and c) a third instruction, which calls a third function,
starting an execution environment with the module providing the first function, and receiving the return value thereof as first result value,
checking the condition indicated in the second instruction, ascertaining that the condition is satisfied, and starting an execution environment with the module providing the third function.

11. A method for translating a computer program from one representation into another representation, in particular into a machine-executable representation, comprising the following steps:
providing a computer network that has at least two computers connected to one another via a network, each having its own main memory per computer,
providing a database that contains multiple different execution environments, each of which having a respective executable module, wherein each of these modules provides a respective function, and the execution environment containing this module is executable on at least one of the computers in a namespace of its own, wherein the module calls an operating system core of the relevant computer, and this work environment returns a value that is output by this module as the result of the function provided thereby, wherein the database contains, in addition to each of the modules, an interface definition of its own that describes the function provided by the relevant module, and is connected to the network,
reading in a computer program that has at least a) a first instruction, which calls a first function that returns a result value, and b) a second instruction, which calls a second function with the received result value of the first function as a parameter,
reading in a first interface definition of a first module providing the first function, wherein the first interface definition describes the first function by virtue of its containing at least one data type of its result value, from the database,
reading in a second interface definition of a second module providing the second function, wherein the second interface definition describes the second function by virtue of its containing at least one data type of a parameter of the second function, from the database, and
comparing the data type of the result value of the first function with the data type of the parameter of the second function,
ascertaining inequality between the two data types, and sending an error to an input apparatus and/or terminating the translation process.

12. The method as claimed in claim 11, wherein the database contains, for an execution environment contained therein, not only the interface definition of the provided function but also an interface definition for additional parameters that are to be received by an input device.

13. A method for executing the computer program translated in accordance with claim 11, wherein the instructions contained in the translated representation are executed and it is ascertained that, for one of the instructions, a function called in this instruction is provided by one of the execution environments, and then i) the relevant execution environment is loaded on one of the computers, ii) the module contained therein is executed on the relevant computer, and iii) the value output by this module is read in as result value of the function provided by this module.

14. The method as claimed in claim 13, wherein after the result value is read in, iv) the relevant execution environment is unloaded.

15. A computer network configured to perform the method as claimed in claim 1, comprising a microscope connected to the computer network via a control computer, wherein the control computer is configured such that it receives a control instruction for the microscope from one of the other computers and controls the microscope in accordance with the instruction.

* * * * *